United States Patent
Huang et al.

(10) Patent No.: US 10,826,052 B1
(45) Date of Patent: Nov. 3, 2020

(54) ELECTROLYTIC COPPER FOIL AND ELECTRODE AND LITHIUM ION CELL COMPRISING THE SAME

(71) Applicant: CHANG CHUN PETROCHEMICAL CO., LTD., Taipei (TW)

(72) Inventors: Jian-Ming Huang, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

(*) Notice: Subject to any disclaimer, the term of this patent is extended or adjusted under 35 U.S.C. 154(b) by 0 days.

(21) Appl. No.: 16/745,559

(22) Filed: Jan. 17, 2020

(30) Foreign Application Priority Data

Aug. 27, 2019 (TW) .............................. 108130692 A

(51) Int. Cl.
*H01M 4/04* (2006.01)
*H01M 10/0525* (2010.01)
*H01M 4/02* (2006.01)

(52) U.S. Cl.
CPC ....... *H01M 4/0452* (2013.01); *H01M 4/0407* (2013.01); *H01M 10/0525* (2013.01); *H01M 2004/021* (2013.01)

(58) Field of Classification Search
CPC . H01M 4/0452; H01M 4/0407; H01M 4/0525
See application file for complete search history.

(56) References Cited

U.S. PATENT DOCUMENTS

| 2005/0175900 A1* | 8/2005 | Yasuda | H01M 4/387 429/231.95 |
| 2013/0115510 A1* | 5/2013 | Tani | H01M 4/1395 429/199 |
| 2018/0062180 A1* | 3/2018 | Kim | H01M 4/386 |

(Continued)

FOREIGN PATENT DOCUMENTS

| JP | 5128695 B2 | 1/2013 |
| KR | 20180090207 | 8/2018 |
| KR | 20190055007 | 5/2019 |

(Continued)

OTHER PUBLICATIONS

Japan Intellectual Property Office "Japan First Examination Report for Japan application No. 2020-031055" dated Aug. 18, 2020, Japan.

(Continued)

*Primary Examiner* — Matthew J Merkling
(74) *Attorney, Agent, or Firm* — WPAT, PC

(57) ABSTRACT

Provided are an electrolytic copper foil, an electrode comprising the same, and a lithium ion cell comprising the same. The electrolytic copper foil comprises first and second chromium layers each containing 15 μg/dm$^2$ to 50 μg/dm$^2$ of chromium, and has a resistivity of 1.72 μΩ*cm to 2.25 μΩ*cm. First and second surfaces thereof each have a contact angle of 15 to 50 degrees with oxalic acid, the first surface has a lightness of 17.5 to 40 and the second surface has a lightness of 38 to 60. With these characteristics, the electrolytic copper foil has good weatherability and good (Continued)

adhesion strength with the active materials, thereby improving the cycle life of the lithium ion cell comprising the same.

20 Claims, 2 Drawing Sheets

(56) References Cited

U.S. PATENT DOCUMENTS

2018/0226655 A1* 8/2018 Arai .................. H01M 10/0525
2019/0148736 A1 5/2019 Cheng et al.

FOREIGN PATENT DOCUMENTS

| | | |
|---|---|---|
| TW | 201111562 | 4/2011 |
| TW | 201212361 | 3/2012 |
| TW | 201340796 | 10/2013 |
| TW | 201422419 | 6/2014 |
| TW | 201644331 | 12/2016 |
| TW | 201644332 | 12/2016 |
| TW | 201807869 | 3/2018 |

OTHER PUBLICATIONS

Korea Intellectual Property Office "Patent Approval Decision from Korea Intellectual Property Office for Korea application No. 10-2020-0019600" dated Jul. 29, 2020, Korea.

* cited by examiner

ELECTROLYTIC COPPER FOIL AND ELECTRODE AND LITHIUM ION CELL COMPRISING THE SAME

CROSS-REFERENCE TO RELATED APPLICATION

Pursuant to 35 U.S.C. § 119(a), this application claims the benefit of the priority to Taiwan Patent Application No. 108130692 filed on Aug. 27, 2019. The content of the prior application is incorporated herein by its entirety.

BACKGROUND OF THE INVENTION

1. Field of the Invention

The invention relates to an electrolytic copper foil, especially to an electrolytic copper foil for a lithium ion cell. In addition, the invention also relates to an electrode and a lithium ion cell comprising the electrolytic copper foil.

2. Description of the Prior Arts

With the popularization of portable electronic devices (PED), electric vehicles (EV), and hybrid electric vehicles (HEV), the lithium ion cell with high power density, fast charging, and no memory effects has being actively developed to meet the needs of today's booming market.

The lithium ion cell relies on lithium ions traveling back and forth between a negative electrode and a positive electrode during charging and discharging. The electrode of the lithium ion cell is usually produced by coating an active material slurry on a metal foil. Depending on the materials, the lithium ion cell can be classified into $LiCoO_2$ cell, $LiNiO_2$ cell, $LiMn_2O_4$ cell, $LiCo_xNi_{1-x}O_2$ cell, and $LiFePO_4$ cell, etc.

The electrode of the lithium ion cell is usually produced by coating an active material slurry on both sides of the copper foil, so the characteristics and the quality of the copper foil have a great influence on the performance of the lithium ion cell. For example, the active materials of the negative electrode inevitably expand and contract during charging and discharging of the lithium ion cell. However, the conventional copper foil lacks good adhesion strength with the active materials of the negative electrode, so the active materials are easily peeled off or detached from the surface of the copper foil during charging and discharging, and thus the cycle life of the lithium ion cell is shortened.

SUMMARY OF THE INVENTION

In view of the above-mentioned drawbacks, one of the objectives of the present invention is to obviate and mitigate the occurrence that the electrode active materials are easily peeled off or detached from the copper foil during charging and discharging, thereby improving the cycle life performance of the lithium ion cell.

To achieve the aforesaid objectives, the present invention provides an electrolytic copper foil, which comprises a copper layer, a first chromium layer, and a second chromium layer, and the copper layer comprises a deposited side and a drum side opposite the deposited side. The first chromium layer is formed on the deposited side of the copper layer, and the first chromium layer comprises a first surface opposite the deposited side of the copper layer. For the first chromium layer, a chromium amount of the first chromium layer is greater than or equal to 15 micrograms per square decimeter ($\mu g/dm^2$) and less than or equal to 50 $\mu g/dm^2$, a contact angle between the first surface and an oxalic acid solution of 0.1 percent by weight (wt %) is greater than or equal to 15 degrees and less than or equal to 50 degrees, and a lightness of the first surface is greater than or equal to 17.5 and less than or equal to 40. The second chromium layer is formed on the drum side of the copper layer, and the second chromium layer comprises a second surface opposite the drum side of the copper layer. For the second chromium layer, a chromium amount of the second chromium layer is greater than or equal to 15 $\mu g/dm^2$ and less than or equal to 50 $\mu g/dm^2$, a contact angle between the second surface and the 0.1 wt % oxalic acid solution is greater than or equal to 15 degrees and less than or equal to 50 degrees, and a lightness of the second surface is greater than or equal to 38 and less than or equal to 60. The electrolytic copper foil has an electrical resistivity greater than or equal to 1.72 $\mu\Omega$*cm and less than or equal to 2.25 $\mu\Omega$*cm.

With said chromium amounts of the first and the second chromium layers, the contact angles respectively between the first surface and the 0.1 wt % oxalic acid solution and between the second surface and the 0.1 wt % oxalic acid solution, the lightness of the first and the second surfaces, and the resistivity of the electrolytic copper foil, the technical means of the present invention can specifically improve both the weatherability of the electrolytic copper foil and the adhesion strength between the electrolytic copper foil and the active materials, thereby prolonging the cycle life of the lithium ion cell comprising the same.

In the present specification, the copper layer of the electrolytic copper foil is prepared by using a copper electrolyte solution comprising copper sulfate and sulfuric acid as main components, a titanium plate coated by iridium or iridium oxide as a dimensionally stable anode (DSA), and a titanium drum as a cathode drum, applying a direct current between these two electrodes to make the copper ions in the copper electrolyte solution electrodeposit on the cathode drum, and then stripping and winding the copper layer from the cathode drum continuously. The copper layer comprises two sides opposite each other, a side of the copper layer near the cathode drum during the process is called "drum side", and the other side of the copper layer near the copper electrolyte solution during the process is called "deposited side".

In the present specification, colors of the first surface and the second surface are defined in accordance with the L*a*b* color system established by the Commission Internationale de l'Eclairage (CIE). The term "lightness" is directed to L* defined in the L*a*b* color system, the higher the lightness value, the brighter the surface, i.e., closer to white. The term "chroma a value" is directed to a* defined in the L*a*b* color system; the lower a* value represents that the color of the surface is closer to green, and the higher a* value represents that the color of the surface is closer to red. The term "chroma b value" is directed to b* defined in the L*a*b* color system; the lower b* value represents that the color of the surface is closer to blue, and the higher b* value represents that the color of the surface is closer to yellow.

Preferably, the lightness of the first surface of the electrolytic copper foil in the present invention may be greater than or equal to 25 and less than or equal to 40, and the lightness of the second surface may be greater than or equal to 45 and less than or equal to 60. Accordingly, the electrolytic copper foil in the present invention applied to the lithium ion cell can further optimize its charge and discharge cycle life performance.

Preferably, the contact angle between the first surface of the electrolytic copper foil and the 0.1 wt % oxalic acid solution may be greater than or equal to 15 degrees and less than 40 degrees, and the contact angle between the second surface and the 0.1 wt % oxalic acid solution may be greater than or equal to 15 degrees and less than or equal to 40 degrees. More preferably, the contact angle between the first surface and the 0.1 wt % oxalic acid solution may be greater than or equal to 15 degrees and less than or equal to 30 degrees, and the contact angle between the second surface and the 0.1 wt % oxalic acid solution may be greater than or equal to 15 degrees and less than or equal to 30 degrees. Accordingly, when applied to the lithium ion cell, the electrolytic copper foil in the present invention can further improve the adhesion strength between the electrolytic copper foil and the active materials.

Preferably, for the electrolytic copper foil in the present invention, the chroma a value of the first surface may be greater than or equal to 3 and less than or equal to 12, and the chroma a value of the second surface may be greater than or equal to 8 and less than or equal to 16.

Preferably, the chroma b value of the first surface may be greater than or equal to 1.3 and less than or equal to 18, and the chroma b value of the second surface may be greater than or equal to 8 and less than or equal to 16.

In addition, the present invention further provides an electrode for the lithium ion cell, which comprises the aforesaid electrolytic copper foil.

According to the present invention, the electrolytic copper foil can be suitably applied to an anode (also called a negative electrode) and/or a cathode (also called a positive electrode) of the lithium ion cell. The aforesaid electrolytic copper foil is suitably applied to a current collector. The electrolytic copper foil is coated with at least one layer of the active materials on one side or both sides thereof to prepare the electrode.

The aforesaid active materials, such as anode active materials and cathode active materials, can make the electrode have good cycle performance. The anode active substance contained in the anode active materials may be a carbon-containing substance, a silicon-containing substance, a silicon carbide composite, a metal, a metal oxide, a metal alloy or a polymer, wherein the carbon-containing substance or the silicon-containing substance is preferable, but it is not limited thereto. Specifically, the carbon-containing substance may be, but is not limited to, a non-graphitizing carbon, a coke, graphite, a glasslike carbon, a carbon fiber, an activated carbon, a carbon black or a high polymer calcined substance. The coke comprises pitch coke, needle coke or petroleum coke, etc. The high polymer calcined substance is obtained by calcining a phenol-formaldehyde resin or a furan resin at a suitable temperature for carbonation. The silicon-containing substance has an excellent ability to form an alloy with lithium ions and an excellent ability to extract lithium ions from the lithium alloy. When the silicon-containing substance is applied to a lithium ion secondary cell, a high energy density secondary cell can be obtained. The silicon-containing substance may be combined with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), chromium (Cr), ruthenium (Ru), molybdenum (Mo), or the combinations thereof to form an alloy. The element of the metal or metal alloy may be selected from the group consisting of Co, Fe, Sn, Ni, Cu, Mn, Zn, In, Ag, Ti, Ge, Bi, Sb, Cr, Ru, and Mo, but it is not limited thereto. The aforesaid metal oxide is, but not limited to, ferric oxide, triiron tetraoxide, ruthenium dioxide, molybdenum dioxide and molybdenum trioxide. The examples of the aforesaid polymers include, but are not limited to, polyacetylene and polypyrrole.

Furthermore, the present invention further provides a lithium ion cell comprising the aforesaid electrolytic copper foil. The lithium ion cell comprises an anode, a cathode, and an electrolyte solution. In some embodiments, the anode and cathode can be separated through a separator in the lithium ion cell.

According to the present invention, the electrolyte solution may comprise a solvent, an electrolyte, or an additive added whenever appropriate. The solvent of the electrolyte solution comprises a non-aqueous solvent, for example, a cyclic carbonate such as ethylene carbonate (EC) or propylene carbonate (PC); a linear carbonate such as dimethyl carbonate (DMC), diethyl carbonate (DEC), or ethyl methyl carbonate (EMC); or sultone, but it is not limited thereto. Said solvent may be used alone or in combination of two or more solvents.

The aforesaid lithium ion cell, also called the lithium ion secondary cell, may be a stacked lithium ion cell comprising the anode and the cathode stacked through the separator, or may be a spirally-wound lithium ion cell comprising a continuous electrode and the separator spirally wound and stacked together, but it is not particularly limited thereto. For example, the lithium ion cell can be applied as a cylindrical secondary cell for a personal notebook computer, and can be applied as a rectangular parallelepiped secondary cell, a button type secondary cell, or a coin type secondary cell for a mobile phone, but it is not limited thereto.

DETAILED DESCRIPTION OF THE PREFERRED EMBODIMENTS

Hereinafter, several embodiments are described to illustrate the embodiments of an electrolytic copper foil, an electrode, and a lithium ion cell of the present invention, and several comparative examples are provided for comparison. One person skilled in the art can easily realize the advantages and effects of the present invention from the following examples and comparative examples. Therefore, it should be understood that the descriptions proposed herein are just preferable examples for the purpose of illustrations only, not intended to limit the scope of the present invention. One person skilled in the art can make various modifications and variations in order to practice or apply the present invention in accordance with the ordinary knowledge without departing from the spirit and scope of the present invention.

Electrolytic Copper Foil

Examples 1 to 11: Electrolytic Copper Foil

Figure 1:
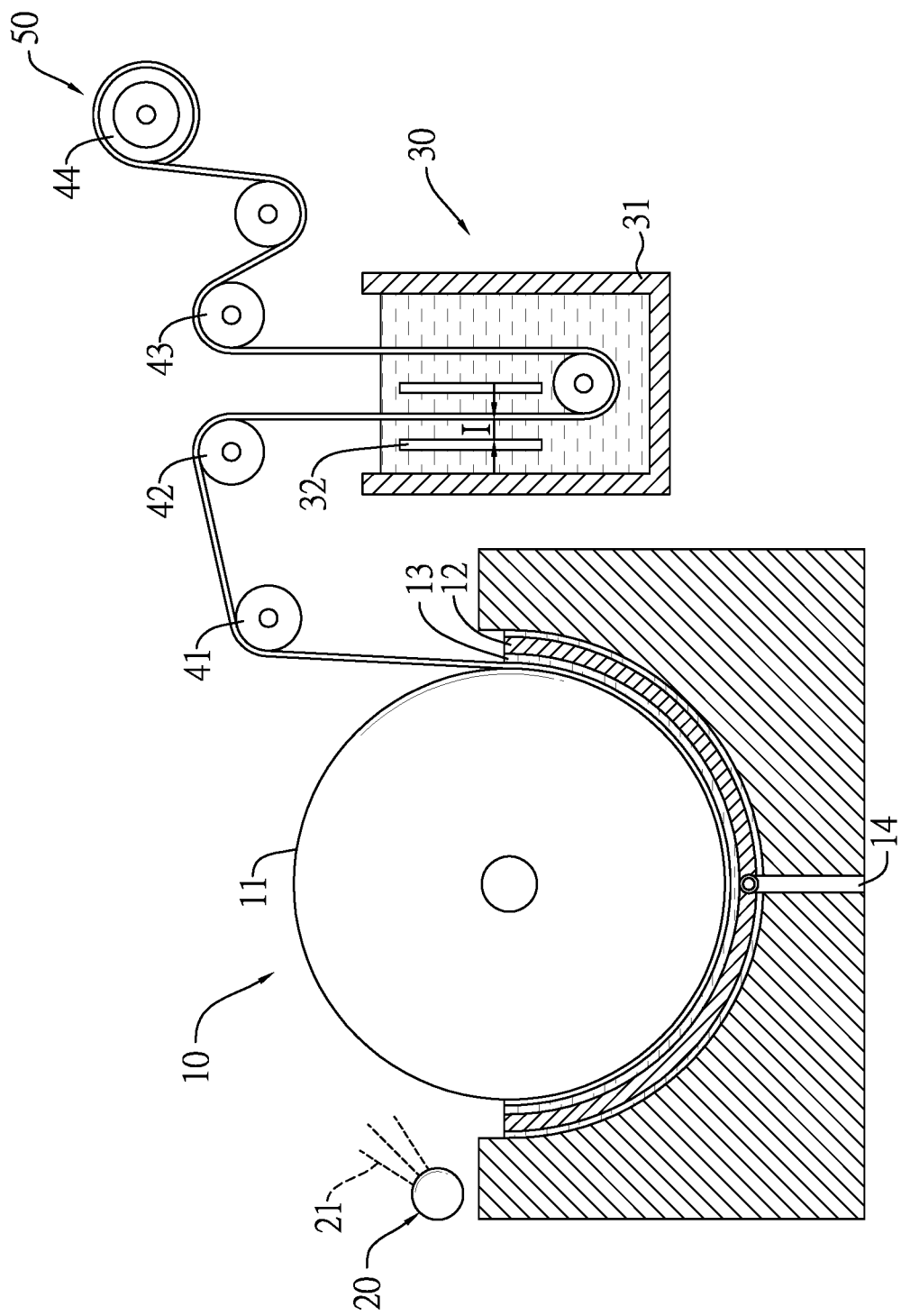
FIG. 1 is a schematic view of preparing an electrolytic copper foil.

Electrolytic copper foils of Examples 1 to 11 were produced by using a production apparatus as shown in FIG. 1 through the substantially identical process including a spraying step, an electrodeposition step, and an anti-tarnish treatment step. The differences among Examples 1 to 11 mainly depend on the parameters set in the spraying step and the anti-tarnish treatment step, as well as the composition of the anti-tarnish solution.

As shown in FIG. 1, the production apparatus for producing the electrolytic copper foil comprises an electrodeposition equipment 10, a spraying equipment 20, a surface treatment equipment 30, and a series of guide rollers. The electrodeposition equipment 10 comprises a cathode drum 11, an insoluble anode 12, a copper electrolyte 13 and a feed pipe 14. The cathode drum 11 is rotatable and comprises a surface which is selectively mechanically polished by a polishing wheel (not shown in figures). The insoluble anode 12 is set below the cathode drum 11 and substantially surrounds the lower half of the cathode drum 11. The cathode drum 11 and the insoluble anode 12 are spaced apart from each other to accommodate the copper electrolyte solution 13 introduced through the feed pipe 14. The aforesaid feed pipe 14 has a plurality of feed holes which are spaced apart from each other (not shown in figures). The spraying equipment 20 is set about 5 cm apart from the cathode drum 11. The surface treatment equipment 30 comprises a treatment tank 31 and electrodes 32 disposed therein. The series of guide rollers comprise a first guide roller 41, a second guide roller 42, a third guide roller 43, and a fourth guide roller 44 for transporting a raw copper foil, the surface-treated copper foil and the product, and finally the raw copper foil is wound on the fourth guide roller 44 to obtain the electrolytic copper foil 50.

The methods for producing the electrolytic copper foils of Examples 1 to 11 by using the production apparatus of FIG. 1 are described as follows.

First, the composition of the copper electrolyte solution used in the electrodeposition step was as follows:

Copper sulfate ($CuSO_4 \cdot 5H_2O$): 320 grams per liter (g/L);

Sulfuric acid: 110 g/L;

Low molecular weight gelatin (SV, purchased from Nippi Inc., with a molecular weight between 4000 and 7000 Da): 5.5 milligrams per liter (mg/L);

Sodium 3-mercapto-1-propanesulfonate (MPS, purchased from Taiwan Hopax Chemicals Manufacturing Company Ltd.): 3 mg/L;

Hydrochloric acid (purchased from RCI Labscan Ltd.): 25 mg/L; and

Thiourea (purchased from Panreac Quimica Sau): 0.01 mg/L.

The copper electrolyte solution used in the electrodeposition step was also used as a spraying solution in the spraying step, and the copper electrolyte solutions used in the aforesaid two steps were of the same composition.

During the electrodeposition step, the spraying equipment 20 was set at approximately 5 cm apart from the cathode drum 11 at a spraying angle of elevation angle 45°. The copper electrolyte solution (i.e., the spraying solution 21) of 50° C. was sprayed at a flow rate of 5 liters per minute (L/min) to 10 L/min to a not-yet-dipped region of the surface of the cathode drum 11 with a parabolic distribution. The temperature of the copper electrolyte solution 13 was set at 50° C., and a current with a current density of 50 Ampere/square decimeter ($A/dm^2$) flowed between the cathode drum 11 and the insoluble anode 12, so that copper ions of the copper electrolyte solution 13 were electrodeposited on the surface of the cathode drum 11 to form the raw copper foil. Then the raw copper foil was stripped from the cathode drum 11 and guided to the first guide roller 41.

Subsequently, the raw copper foil was guided to the surface treatment equipment 30 through the first guide roller 41 and the second guide roller 42 to carry out the anti-tarnish treatment. The raw copper foil was immersed in the treatment tank 31 filled with the anti-tarnish solution, and then processed with electrodeposition to form a chromium layer.

The composition of the anti-tarnish solution and the parameters of the anti-tarnish treatment were described as follows.

Oxalic acid: 0 g/L to 1.0 g/L;

Chromic acid ($CrO_3$): 1.0 g/L to 2.0 g/L;

Surfactant (Triton X-100, purchased from Sigma-Aldrich Corp.): 0 g/L to 1.0 g/L;

Solution temperature: 25° C.;

Current density: 0.5 $A/dm^2$ to 1.5 $A/dm^2$;

Processing time: 5 seconds; and

The distance between the electrode 32 and the raw copper foil (referred to as the electrode interval I): 10 millimeters (mm) to 15 mm.

After the aforesaid anti-tarnish treatment, the anti-tarnish treated copper foil was guided to the third guide roller 43 to be dried, and wound on the fourth guide roller 44 to obtain the electrolytic copper foil 50 with a thickness of about 8 micrometers (m).

Figure 2:
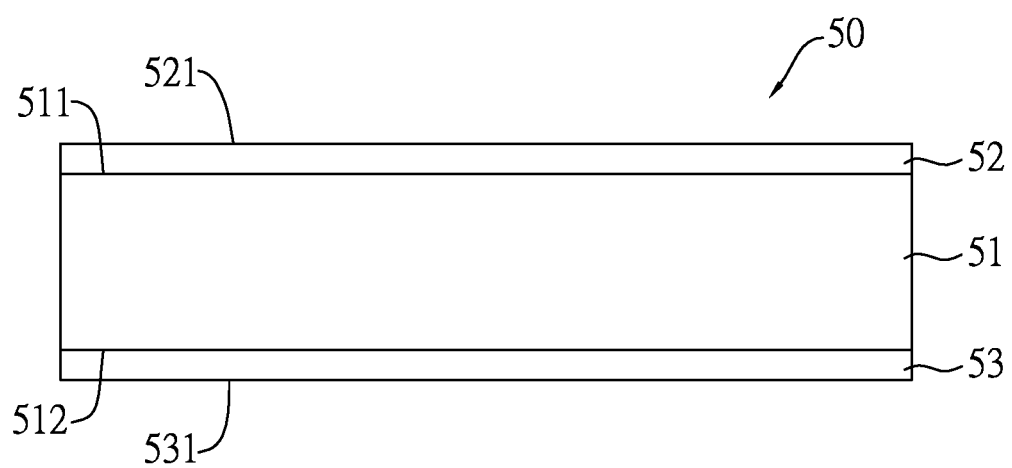
FIG. 2 is a schematic side view of the electrolytic copper foil.

According to the aforesaid process, the electrolytic copper foils of Examples 1 to 11 were obtained. As shown in FIG. 2, the electrolytic copper foil 50 of each Example comprises a copper layer 51 (corresponding to the raw copper foil which is not treated with the anti-tarnish treatment), a first chromium layer 52, and a second chromium layer 53. The copper layer 51 comprises a deposited side 511 and a drum side 512 opposite the deposited side 511. The first chromium layer 52 is formed on the deposited side 511 of the copper layer 51 and comprises a first surface 521 opposite the deposited side 511. The second chromium layer 53 is formed on the drum side 512 of the copper layer 51 and comprises a second surface 531 opposite the drum side 512.

In the above manufacturing process, the flow rate set in the spraying step, the current density, the electrode interval, and the composition of the anti-tarnish solution set in the anti-tarnish treatment step of Examples 1 to 11 are listed in the following Table 1.

In another embodiment, for the surface treatment step, the raw copper foil stripped from the cathode drum may be guided to other connecting surface treatment equipment for roughening treatment or passivation treatment before the anti-tarnish treatment, so as to modify the characteristics of the electrolytic copper foil. In this case, the two outermost opposite sides of a copper foil treated with other surface treatment were called deposited side and drum side.

Comparative Examples 1 to 11: Electrolytic Copper Foil

The electrolytic copper foils of Comparative Examples 1 to 11 were provided for comparison. The process used to produce the electrolytic copper foils of Comparative Examples 1 to 11 was similar to that of Examples 1 to 11. The differences were that the spraying parameter and the composition of the anti-tarnish solution and the parameters of the anti-tarnish treatment in Comparative Examples 1 to 11 were not adequately controlled. Parameters of Comparative Examples 1 to 11 different from those of the aforesaid Examples are also listed in Table 1; and as described above, the electrolytic copper foils of Comparative Examples 1 to 11 are also shown in FIG. 2.

TABLE 1

The spraying parameter of the spraying step and the composition of the anti-tarnish solution and the parameters of the anti-tarnish step used to produce the electrolytic copper foils of Examples 1 to 11 (E1 to E11) and Comparative Examples 1 to 11 (C1 to C11).

| | Spraying step | Anti-tarnish treatment step | | | | |
|---|---|---|---|---|---|---|
| | Parameter | Composition of anti-tarnish solution | | | Parameters | |
| Example No. | Flow rate of spraying solution (L/min) | Conc. of oxalic acid (g/L) | Conc. of surfactant (g/L) | Conc. of chromic acid (g/L) | Current density (A/dm$^2$) | Electrode Interval (mm) |
| E1 | 10 | 0.5 | 0.5 | 1.0 | 0.5 | 10 |
| E2 | 10 | 1.0 | 0.5 | 1.0 | 0.5 | 10 |
| E3 | 10 | 0.5 | 0.5 | 2.0 | 0.5 | 10 |
| E4 | 10 | 1.0 | 0.5 | 2.0 | 0.5 | 10 |
| E5 | 10 | 0.5 | 0.5 | 1.0 | 1.5 | 10 |
| E6 | 10 | 1.0 | 0.5 | 1.0 | 1.5 | 10 |
| E7 | 10 | 0.5 | 1.0 | 1.0 | 0.5 | 10 |
| E8 | 10 | 1.0 | 1.0 | 1.0 | 0.5 | 10 |
| E9 | 10 | 0.5 | 1.0 | 1.0 | 0.5 | 15 |
| E10 | 10 | 1.0 | 0.5 | 1.0 | 1.5 | 15 |
| E11 | 5 | 0 | 0 | 1.0 | 0.5 | 10 |
| C1 | 10 | 0.5 | 0.5 | 0.5 | 0.5 | 10 |
| C2 | 10 | 0.5 | 0.5 | 1.0 | 0.1 | 10 |
| C3 | 10 | 1.2 | 0.5 | 1.0 | 0.5 | 10 |
| C4 | 10 | 0.5 | 0.5 | 2.5 | 0.5 | 10 |
| C5 | 10 | 0.5 | 0.5 | 1.0 | 2.0 | 10 |
| C6 | 10 | 0.5 | 0.3 | 1.0 | 0.5 | 10 |
| C7 | 10 | 0.5 | 1.5 | 1.0 | 0.5 | 10 |
| C8 | 10 | 0.5 | 0.5 | 1.0 | 0.5 | 5 |
| C9 | 10 | 0.3 | 0.5 | 1.0 | 0.5 | 10 |
| C10 | 10 | 1.5 | 0.5 | 1.0 | 0.5 | 10 |
| C11 | 10 | 0 | 0 | 1.0 | 0.5 | 10 |

Test Example 1: Contact Angle of Oxalic Acid Solution

First, 0.1 g of oxalic acid was placed in a beaker and added with water until the total weight was 100 g to obtain a 0.1 wt % oxalic acid solution. Then the electrolytic copper foil was placed in a hand-held contact angle meter (instrument model: Phoenix i, purchased from Surface Electro Optics), and a nozzle of a dispenser was set at a height of about 2 mm from the surface of the electrolytic copper foil. After that, the knob of the dispenser was turned to draw a drop of about 10 microliters (μL) to 15 μL of the 0.1 wt % oxalic acid solution on the surface of the electrolytic copper foil, so as to measure the contact angle of the electrolytic copper foil.

The contact angles between the 0.1 wt % oxalic acid solution and the first surface and between the 0.1 wt % oxalic acid solution and the second surface of the electrolytic copper foils of Examples 1 to 11 and Comparative Examples 1 to 11 were respectively measured by the aforesaid methods, and the results were shown in the following Table 2.

Test Example 2: L*a*b*

In accordance with the color standard of CIE 1976, the electrolytic copper foils of Examples 1 to 11 and Comparative Examples 1 to 11 were analyzed by a spectrophotometer (instrument model: CM-2500c, purchased from Konica Minolta) with a D65 daylight as the light source and 2° of an observation angle to measure the reflected light from each of the first surface and the second surface of each electrolytic copper foil, the data was converted into L*a*b* three-dimensional space. The lightness (L) and the chroma a and b values of each of the first surfaces and the second surfaces of the electrolytic copper foils were recorded, and the results were also shown in the following Table 2.

Test Example 3: Resistivity

According to the method of IPC-TM-650 2.5.14, the electrolytic copper foils of Examples 1 to 11 and Comparative Examples 1 to 11 (each having a size of 100 mm*100 mm) were analyzed with a four-point probe measurement system (instrument model: LRS4-TG2, purchased from KeithLink Technology Co., Ltd.) having a needle diameter of 100 μm and a needle spacing of 1.6 mm, so as to measure the resistivity of each of the first surfaces and the second surfaces of the electrolytic copper foils. The resistivity conversion factor was 4.532. The results were also shown in the following Table 2.

Test Example 4: Chromium Amount

In this test example, the electrolytic copper foils of Examples 1 to 11 and Comparative Examples 1 to 11 (each having a size of 100 mm×100 mm) were taken as test samples.

First, the second surface of each electrolytic copper foil was coated with a protective layer to prevent the second chromium layer from dissolving in a hydrochloric acid solution, and then the partially-protected electrolytic copper foil was immersed in 20 ml, 18 wt % of hydrochloric acid solution at ambient temperature for 10 minutes to make the first chromium layer completely dissolved. A solution, having the first chromium layer dissolved therein, was analyzed by an inductively coupled plasma optical emission spectrometer (ICP-OES, instrument model: ICP7000, purchased from Thermo Fisher) with an argon gas as a carrier gas and 0.5 L/min of a nebulizer flow rate, so as to measure the chromium amount of the first chromium layer.

Similarly, the electrolytic copper foils of Examples 1 to 11 and Comparative Examples 1 to 11 with the same size were taken as the test samples. A protective layer was coated on the first surface of each electrolytic copper foil to prevent the first chromium layer from dissolving in the hydrochloric acid solution, and then the partially-protected electrolytic copper foil was immersed in 20 ml, 18 wt % hydrochloric acid solution at ambient temperature for 10 minutes, so that the second chromium layer was completely dissolved. A solution, having the second chromium layer dissolved therein, was then analyzed by ICP-OES with the same argon gas and 0.5 L/min of the nebulizer flow rate to measure the chromium amount of the second chromium layer.

The results of the chromium amounts of the first and second chromium layers of each of the electrolytic copper foils were also shown in the following Table 2.

Test Example 5: Weatherability

In this test example, the electrolytic copper foils of Examples 1 to 11 and Comparative Examples 1 to 11 were adopted as test samples. Each electrolytic copper foil was placed in a constant temperature and humidity oven set with a temperature of 70° C. and a relative humidity of 80% for 15 hours, and the surfaces of the electrolytic copper foils were visually observed by three testers to inspect any discoloration, or white spots and black spots occurred for evaluation of weatherability. After placing the electrolytic copper foil in the oven, if no obvious discoloration, white spots or black spots were found, the electrolytic copper foil was marked with "0" in Table 2, indicating that the electrolytic copper foil has good weatherability; on the other hand, if any discoloration or white spots or black spots were found, the electrolytic copper foil was marked with "X" in Table 2, indicating that the weatherability of the electrolytic copper foil is poor.

Discussion on Characteristics of Electrolytic Copper Foils

The electrolytic copper foils of Examples 1 to 11 each have all the following characteristics:
 (1) The chromium amount of the first chromium layer ranges from 15 μg/dm² to 50 μg/dm², and the chromium amount of the second chromium layer ranges from 15 μg/dm² to 50 μg/dm²;
 (2) The contact angles between the first surface of the first chromium layer and the 0.1 wt % oxalic acid solution and between the second surface of the second chromium layer and the 0.1 wt % oxalic acid solution range from 15 degrees to 50 degrees;
 (3) The lightness of the first surface of the first chromium layer is greater than or equal to 17.5 and less than or equal to 40, and the lightness of the second surface of the second chromium layer is greater than or equal to 38 and less than or equal to 60; and
 (4) The resistivity of each of the first surface of the first chromium layer and the second surface of the second chromium layer ranges from 1.72 μΩ*cm to 2.25 μΩ*cm.

With said characteristics, the electrolytic copper foils of Examples 1 to 11 still had good weatherability without incurring discoloration after the test. In contrast, the electrolytic copper foils of Comparative Examples 1 to 11, which were not prepared by adequate parameters failed to have all of the aforesaid characteristics (1) to (4), so the electrolytic copper foils of Comparative Examples 1, 2, 6 and 11 still had the problem of discoloration, indicating that these electrolytic copper foils had poor weatherability and were not expected to be applied to the lithium ion cell.

TABLE 2 the results of the electrolytic copper foils of Examples 1 to 11 (E1 to E11) and Comparative Examples 1 to 11 (C1 to C11) measured by Test Example 1 to 7.

| Example No. | Contact angle 1st surface | Contact angle 2nd surface | Cr Amount (μg/dm²) 1st Cr layer | Cr Amount (μg/dm²) 2nd Cr layer | L*a*b* 1st surface L | L*a*b* 1st surface a | L*a*b* 1st surface b | L*a*b* 2nd surface L | L*a*b* 2nd surface a | L*a*b* 2nd surface b | Resistivity (μΩ*cm) 1st surface | Resistivity (μΩ*cm) 2nd surface | Weatherability | Adhesion strength (kg) 1st surface | Adhesion strength (kg) 2nd surface | Cycle life (number) |
|---|---|---|---|---|---|---|---|---|---|---|---|---|---|---|---|---|
| E1 | 50 | 44 | 15 | 17 | 35.0 | 11.0 | 1.3 | 54.6 | 14.0 | 8.5 | 1.72 | 1.75 | O | 0.20 | 0.23 | 1254 |
| E2 | 15 | 17 | 18 | 20 | 28.5 | 10.3 | 18.0 | 50.9 | 13.7 | 15.7 | 1.88 | 1.92 | O | 0.45 | 0.44 | 1189 |
| E3 | 49 | 45 | 35 | 39 | 31.5 | 5.6 | 2.0 | 53.4 | 9.6 | 8.0 | 1.84 | 1.85 | O | 0.22 | 0.24 | 1243 |
| E4 | 18 | 20 | 38 | 41 | 30.1 | 4.2 | 17.5 | 52.2 | 9.8 | 15.8 | 2.01 | 2.03 | O | 0.43 | 0.42 | 1212 |
| E5 | 48 | 43 | 45 | 48 | 29.7 | 3.5 | 2.1 | 55.0 | 8.7 | 9.3 | 1.91 | 1.96 | O | 0.24 | 0.27 | 1203 |
| E6 | 17 | 21 | 44 | 50 | 30.2 | 3.4 | 17.8 | 53.3 | 8.5 | 15.3 | 2.21 | 2.25 | O | 0.41 | 0.39 | 1273 |
| E7 | 48 | 43 | 17 | 21 | 20.0 | 10.5 | 1.7 | 38.0 | 14.3 | 9.0 | 1.76 | 1.78 | O | 0.22 | 0.25 | 1098 |
| E8 | 19 | 19 | 20 | 25 | 17.5 | 8.1 | 17.2 | 40.9 | 13.2 | 16.0 | 1.84 | 1.87 | O | 0.42 | 0.41 | 1054 |
| E9 | 47 | 42 | 19 | 20 | 34.6 | 12.0 | 1.5 | 52.1 | 16.0 | 8.6 | 1.80 | 1.82 | O | 0.21 | 0.24 | 1239 |
| E10 | 18 | 21 | 39 | 44 | 40.0 | 6.3 | 16.3 | 60.0 | 15.1 | 14.7 | 2.13 | 2.18 | O | 0.42 | 0.40 | 1356 |
| E11 | 40 | 19 | 17 | 19 | 38.3 | 7.7 | 1.4 | 51.5 | 12.8 | 8.2 | 1.74 | 1.80 | O | 0.21 | 0.43 | 1265 |

Test Example 6: Adhesion Strength

The first surfaces and the second surfaces of the electrolytic copper foils of Examples 1 to 11 may be further coated with an anode slurry to produce an anode for a lithium ion cell.

Specifically, the anode can be produced by the following steps.

First of all, 100 g of an active composition was mixed with 60 g of a solvent (N-methylpyrrolidone (NMP)) to prepare the anode slurry, wherein the active composition in the anode slurry comprised 93.9 wt % of mesophase graphite powders (MGP), 1 wt % of conductive carbon black powders (Super P®), 5 wt % of a solvent binder (polyvinylidene fluoride, PVDF 6020), and 0.1 wt % of oxalic acid.

Next, the anode slurry was coated on each of the first and second surfaces of the electrolytic copper foil at the rate of 5 m/min until each thickness thereof reached 200 μm, and then dried in a 160° C. oven. After that, the anode slurry coated on the electrolytic copper foil was pressed by a pressing machine at a pressing speed of 1 m/min under a pressure of 3000 pounds per square inch (psi) to a density of 1.5 grams per cubic centimeter (g/cm$^3$), and an anode was obtained. The size of the rollers of the pressing machine was 250 mm×250 mm, the hardness of the rollers was 62 to 65 HRC, and the material of the rollers was high-carbon chromium bearing steel (SUJ2).

The obtained anode, each containing two anode active materials respectively on the first and second surfaces of the electrolytic copper foil, were further cut into a size of 200 mm×20 mm to obtain the test samples. Similarly, the electrolytic copper foils of Comparative Examples 1 to 11 could be processed by the aforesaid method to obtain the test samples, which were adopted to evaluate and compare with the adhesion strengths between the electrolytic copper foils of Examples 1 to 11 and the anode active materials.

Finally, 3M Scotch® Magic™ tape was adhered on both surfaces of each test sample. An IMADA pulling machine (instrument model: DS2-20N) was used to measure the adhesion strengths between the first surface of the electrolytic copper foil and the anode active material and between the second surface thereof and the anode active material of each test sample, and the results were also shown in Table 2 above.

Test Example 7: Cycle Life

In addition to the anodes of Test Example 6, the anodes prepared from the electrolytic copper foils of Examples 1 to 11 could be adopted to further prepare lithium ion cells.

Specifically, the anode for the lithium ion cell was obtained in accordance with the method of the Test Example 6. In addition, for the cathode, 100 g of the active composition was mixed with 195 g of NMP to prepare a cathode slurry, wherein the active composition in the cathode slurry comprised 89 wt % of LiCoO$_2$, 5 wt % of flaked graphite (KS6), 1 wt % of conductive carbon black powders (Super P®), and 5 wt % of polyvinylidene fluoride (PVDF 6020). Next, the cathode slurry was coated on an aluminum foil to a thickness up to 250 μm, and then dried in the 160° C. oven to obtain the cathode. Next, the cathodes and the anodes were alternately stacked with a microporous separator (model: Celgard 2400, manufactured by Celgard Co., Ltd.) sandwiched therebetween, and then placed in a pressing mold filled with electrolyte solution (model LBC322-01H, purchased from Shenzhen Capchem Technology Co., Ltd.), and sealed to form a laminated lithium ion cell. The laminated lithium ion cell in a size of 41 mm×34 mm×53 mm was the test sample for subsequent evaluation of cycle life performance. Similarly, the electrolytic copper foils of Comparative Examples 1 to 11 could be processed by the aforesaid method to obtain the test samples, which could be adopted to evaluate and compare with the cycle life performances of the lithium ion cells comprising the electrolytic copper foils of Examples 1 to 11.

For the evaluation of the cycle life performance of the lithium ion cell, each of the test samples was analyzed with a constant current-constant voltage (CCCV) charging mode and a constant current (CC) discharging mode at a temperature of 55° C. The charge and discharge cycle test was set under the conditions of a charging voltage of 4.2 volts (V), a charging current of 5C, a discharging voltage of 2.8 V, and a discharging current of 5C.

In this test example, the cycle life of the lithium ion cell was defined as the number of charge and discharge cycles a lithium ion cell performed when the capacity dropped to 80% of its initial capacity. The results of cycle life test of the lithium ion cells produced from the electrolytic copper foils of Examples 1 to 11 and Comparative Examples 1 to 11 were also shown in Table 2 above.

Discussion of Experimental Results

According to the experimental results as shown in Table 2 above, the electrolytic copper foils of Examples 1 to 11 have the aforesaid characteristics (1) to (4), these electrolytic copper foils not only can obtain good weatherability, but also can obtain proper adhesion strength with the anode active material when applied to the lithium ion cell, such that the cycle life of the lithium ion cell comprising the same can be improved to more than 800 times, even up to 1000 times to 1400 times.

In contrast, the electrolytic copper foils of Comparative Examples 1 to 11 fail to have all of the characteristics (1) to (4), so the electrolytic copper foils cannot have both good weatherability and appropriate adhesion strength with the anode active material, and therefore the cycle life of the lithium ion cell comprising the same cannot reach 800 times. As shown in Table 2 above, the electrolytic copper foils of Comparative Examples 1, 2, 6, and 11 had been confirmed to be not suitable for the lithium ion cell, resulting from their lack of weatherability, thus their results of cycle life test were not listed in Table 2. The electrolytic copper foil of Comparative Example 9 had no problem of insufficient weatherability; however, the electrolytic copper foil had been confirmed to be not applicable to the lithium ion cell due to its serious lacks of adhesion strengths with the anode active materials (both were less than 0.2 kg). No cycle life of a lithium ion cell comprising the electrolytic copper foil of Comparative Example 9 was listed in Table 2. The electrolytic copper foil of Comparative Example 10 had no problem of insufficient weatherability, either, but its adhesion strengths with the anode active materials were too high to improve the cycle life of the lithium ion cell, and thus the cycle life was less than 600 times.

The experimental results of Table 2 further showed that the contact angle between the 0.1 wt % of oxalic acid solution and the first surface and the contact angle between the 0.1 wt % of oxalic acid solution and the second surface of the electrolytic copper foils affect the adhesion strength between the electrolytic copper foil and the anode active material, and thus affect the cycle life of the lithium ion cell comprising the electrolytic copper foil. Take the results of electrolytic copper foils of Comparative Examples 9 to 11 as examples, when the contact angle between the 0.1 wt % of oxalic acid solution and the first or second surface was out of the range of 15 degrees to 50 degrees, the adhesion strengths between the electrolytic copper foils of Comparative Examples 9 and 10 and the anode active materials were too low or too high, and the electrolytic copper foil of Comparative Example 11 had poor weatherability.

Furthermore, the chromium amounts of the first chromium layer and the second chromium layer of the electrolytic copper foil have influence on the weatherability and the resistivity of the electrolytic copper foil. When the electrolytic copper foil is oxidized, it would affect the resistivity, and thus deteriorates the cycle life performance of the lithium ion cell. Take the results of the electrolytic copper foils of Comparative Examples 1, 2, 4, and 5 as examples, when the chromium amounts of the first and second chromium layers exceed the range of 15 μg/dm$^2$ to 50 μg/dm$^2$, both of the electrolytic copper foils of Comparative Examples 1 and 2 had serious lack of weatherability, and the electrolytic copper foils of Comparative Examples 4 and 5 gave poor cycle life performance when applied to the lithium ion cells.

In addition, the lightness of the electrolytic copper foil affects the cycle life performance of the lithium ion cell. Take the results of the electrolytic copper foils of Comparative Examples 6 to 8 and 11 as examples, when the lightness of the first surface of the electrolytic copper foil exceeded the range of 17.5 to 40 and/or the lightness of the second surface exceed the range of 38 to 60, both of the electrolytic copper foils of Examples 6 and 11 had poor weatherability, and both of the electrolytic copper foils of Comparative Examples 7 and 8 exhibited inferior cycle life performance when applied to the lithium ion cell.

Furthermore, the resistivity of each of the first and second surfaces of the electrolytic copper foil also relates to the cycle life when it is applied to the lithium ion cell. When the resistivity of the electrolytic copper foil was out of the range of 1.72 $\mu\Omega$*cm to 2.25 $\mu\Omega$*cm, the cycle life performances of the lithium ion cells comprising the electrolytic copper foils of Comparative Examples 3, 4, 5, and 10 were not satisfactory. It indicated that the electrolytic copper foil of extremely high resistivity deteriorates the cycle life performance of the lithium ion cell.

From the comparison of the characteristics of the electrolytic copper foils of Examples 1 to 11, when the lightness of the first surface of the electrolytic copper foil falls to the range of 25 to 40 and the lightness of the second surface thereof falls to the range of 45 to 60, the cycle life of each of the lithium ion cells comprising the electrolytic copper foils of Examples 1 to 6 and 9 to 11 is improved to more than 1,100 times, which is superior to the cycle life performance of the lithium ion cells comprising the electrolytic copper foils of Examples 7 and 8.

Furthermore, when the contact angle between the first surface of the electrolytic copper foil and the 0.1 wt % of oxalic acid solution is greater than or equal to 15 degrees and less than 40 degrees and the contact angle between the second surface and the 0.1 wt % oxalic acid solution is greater than or equal to 15 degrees and less than or equal to 40 degrees, the adhesion strengths between the first and second surfaces of the electrolytic copper foils of Examples 2, 4, 6, 8, and 10 and the anode active materials can be further optimized.

In summary, the electrolytic copper foil with all characteristics (1) to (4) does improve its weatherability and the adhesion strength between the electrolytic copper foil and the active materials, thereby prolonging the cycle life and improving overall performance of the lithium ion cell comprising such electrolytic copper foil.

Even though numerous characteristics and advantages of the instant disclosure have been set forth in the foregoing description, together with details of the structure and features of the disclosure, the disclosure is illustrative only. Changes may be made in the details, especially in matters of material, shape, size, and arrangement of parts within the principles of the disclosure to the full extent indicated by the broad general meaning of the terms in which the appended claims are expressed.

What is claimed is:

1. An electrolytic copper foil, comprising:
a copper layer comprising a deposited side and a drum side opposite the deposited side;
a first chromium layer formed on the deposited side of the copper layer, wherein the first chromium layer comprises a first surface opposite the deposited side of the copper layer; a chromium amount of the first chromium layer is greater than or equal to 15 $\mu g/dm^2$ and less than or equal to 50 $\mu g/dm^2$, a contact angle between the first surface and a 0.1 wt % oxalic acid solution is greater than or equal to 15 degrees and less than or equal to 50 degrees, a lightness of the first surface is greater than or equal to 17.5 and less than or equal to 40, and a resistivity of the first surface is greater than or equal to 1.72 $\mu\Omega$*cm and less than or equal to 2.25 $\mu\Omega$*cm; and
a second chromium layer formed on the drum side of the copper layer, wherein the second chromium layer comprises a second surface opposite the drum side of the copper layer; a chromium amount of the second chromium layer is greater than or equal to 15 $\mu g/dm^2$ and less than or equal to 50 $\mu g/dm^2$, a contact angle between the second surface and the 0.1 wt % oxalic acid solution is greater than or equal to 15 degrees and less than or equal to 50 degrees, a lightness of the second surface is greater than or equal to 38 and less than or equal to 60, and a resistivity of the second surface is greater than or equal to 1.72 $\mu\Omega$*cm and less than or equal to 2.25 $\mu\Omega$*cm.

2. The electrolytic copper foil as claimed in claim 1, wherein the chroma a value of the first surface is greater than or equal to 3 and less than or equal to 12, and the chroma a value of the second surface is greater than or equal to 8 and less than or equal to 16.

3. The electrolytic copper foil as claimed in claim 1, wherein the chroma b value of the first surface is greater than or equal to 1.3 and less than or equal to 18, and the chroma b value of the second surface is greater than or equal to 8 and less than or equal to 16.

4. The electrolytic copper foil as claimed in claim 2, wherein the chroma b value of the first surface is greater than or equal to 1.3 and less than or equal to 18, and the chroma b value of the second surface is greater than or equal to 8 and less than or equal to 16.

5. The electrolytic copper foil as claimed in claim 1, wherein the lightness of the first surface is greater than or equal to 25 and less than or equal to 40, and the lightness of the second surface is greater than or equal to 45 and less than or equal to 60.

6. The electrolytic copper foil as claimed in claim 2, wherein the lightness of the first surface is greater than or equal to 25 and less than or equal to 40, and the lightness of the second surface is greater than or equal to 45 and less than or equal to 60.

7. The electrolytic copper foil as claimed in claim 3, wherein the lightness of the first surface is greater than or equal to 25 and less than or equal to 40, and the lightness of the second surface is greater than or equal to 45 and less than or equal to 60.

8. The electrolytic copper foil as claimed in claim 4, wherein the lightness of the first surface is greater than or equal to 25 and less than or equal to 40, and the lightness of the second surface is greater than or equal to 45 and less than or equal to 60.

9. The electrolytic copper foil as claimed in claim 1, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

10. The electrolytic copper foil as claimed in claim 2, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

11. The electrolytic copper foil as claimed in claim 3, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

12. The electrolytic copper foil as claimed in claim 4, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

13. The electrolytic copper foil as claimed in claim 5, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

14. The electrolytic copper foil as claimed in claim 6, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

15. The electrolytic copper foil as claimed in claim 7, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

16. The electrolytic copper foil as claimed in claim 8, wherein the contact angle between the first surface and the 0.1 wt % oxalic acid solution is greater than or equal to 15 degrees and less than 40 degrees, and the contact angle between the second surface and the 0.1 wt % oxalic acid solution is greater than or equal to 15 degrees and less than or equal to 40 degrees.

17. The electrolytic copper foil as claimed in claim 9, wherein the contact angle between the first surface and the 0.1 wt % oxalic acid solution is greater than or equal to 15 degrees and less than or equal to 30 degrees, and the contact angle between the second surface and the 0.1 wt % oxalic acid solution is greater than or equal to 15 degrees and less than or equal to 30 degrees.

18. The electrolytic copper foil as claimed in claim 9, wherein the lightness of the first surface is greater than or equal to 25 and less than or equal to 40, and the lightness of the second surface is greater than or equal to 45 and less than or equal to 60.

19. An electrode of a lithium ion cell, comprising the electrolytic copper foil as claimed in claim 1.

20. A lithium ion cell, comprising the electrode as claimed in claim 19.

* * * * *